United States Patent
Safran (12)

(10) Patent No.: US 6,290,354 B1
(45) Date of Patent: Sep. 18, 2001

(54) CORRECTIVE EYEWEAR ATTACHMENT AND METHOD

(75) Inventor: Gordon H. Safran, Beachwood, OH (US)

(73) Assignee: G Safran Corp., Beachwood, OH (US)

( * ) Notice: Subject to any disclaimer, the term of this patent is extended or adjusted under 35 U.S.C. 154(b) by 0 days.

(21) Appl. No.: 09/542,186

(22) Filed: Apr. 4, 2000

(51) Int. Cl.[7] ............... G02C 7/08; G02C 1/00; G02C 5/12

(52) U.S. Cl. ............... 351/57; 351/84; 351/138

(58) Field of Search ............... 351/84, 57, 47, 351/49, 136, 137, 138

(56) References Cited

U.S. PATENT DOCUMENTS

| 1,049,645 | 1/1913 | Baker ............... 351/61 |
| 1,356,666 | 10/1920 | Styll ............... 351/170 |
| 1,401,327 | 12/1921 | Erhard ............... 351/84 |
| 1,471,996 | 10/1923 | Bailey ............... 351/61 |
| 1,585,489 | 5/1926 | Hailman ............... 351/84 |
| 1,735,021 | 11/1929 | Stewart ............... 351/61 |
| 1,933,578 | 11/1933 | Ames, Jr. et al. ............... 351/57 |
| 1,948,636 | 2/1934 | Tillyer ............... 351/159 |
| 3,617,116 | 11/1971 | Jones ............... 351/177 |
| 3,958,867 | 5/1976 | Morgan ............... 351/47 |
| 4,948,244 | 8/1990 | Jones ............... 351/57 |
| 5,663,779 | * 9/1997 | Karasawa ............... 351/41 |
| 5,764,331 | * 6/1998 | Morrison ............... 351/41 |
| 5,790,230 | * 8/1998 | Sved ............... 351/138 |
| 5,841,506 | * 11/1998 | Karasawa et al. ............... 351/47 |
| 5,914,765 | * 6/1999 | Wang ............... 351/49 |

* cited by examiner

*Primary Examiner*—Huy Mai
(74) *Attorney, Agent, or Firm*—Renner, Otto, Boisselle & Sklar, LLP

(57) ABSTRACT

Non-corrective eyewear such as sunglasses, skiing goggles and diving masks can be easily and economically made to correct eyesight with a corrective eyewear attachment that is aesthetically pleasing. The attachment may include a corrective nose piece connector and/or a rotatable lens. The rotatable lens makes it more economical to have prefabricated corrective lenses that requires a particular lens orientation such as when the corrective lens corrects for an astigmatism.

35 Claims, 2 Drawing Sheets

CORRECTIVE EYEWEAR ATTACHMENT AND METHOD

TECHNICAL FIELD

The invention relates generally to eyewear, and more particularly to an attachment of corrective eyewear with non-corrective eyewear.

BACKGROUND

Corrective eyewear has been used for hundreds of years. Typical corrective eyewear is a pair of eyeglasses and includes two lenses in a frame, one or both lenses providing optical correction. The lenses may be of almost any shape, size, color, material, or the like, and the frames may be metal, plastic, composite, or any other suitable material. The numerous choices for lenses and frames allow for almost limitless aesthetic eyewear choices.

Non-corrective eyewear also has been used for many years. An example of non-corrective eyewear is sunglasses, sometimes referred to as sun shades, sunwear, tinted lenses, etc. Many types of sunglasses exist, such as those using polarized lenses, light blocking, absorbing, and/or filtering lenses, etc. other examples of non-corrective eyewear include ski goggles, wind goggles, SCUBA and other swimmer's masks, etc.

Corrective eyewear typically is selected according to the prescription of the wearer since no one single corrective lens will work for everyone. Thus, corrective eyewear must be individually customized to the prescription of the eyeglass wearer at significant cost. A corrective eyeglass wearer may purchase multiple lenses and frames for each type of eyewear owned such as corrective sunglasses and normal, e.g., non-light absorbing or blocking, corrective eyeglasses.

An inexpensive alternative to customizing sunglasses is a pair of shaded lenses within a frame that can be clipped onto the corrective eyeglasses. These clip-on sunglasses are commonly called clip-ons.

Exemplary clip-on sunglasses have a frame with four clips located at the upper right hand, upper left hand, lower right hand, and lower left hand corners of the clip-on sunglasses to attach the clip-on sunglasses to the corrective eyewear. The clip-on sunglasses typically are of similar size and shape to the corrective eyeglasses to which they are attached. If the clip-on sunglasses are too large, they will too easily detach from the corrective eyeglasses while if the clip-on sunglasses are too small they cannot be attached to the corrective eyeglasses. Another type of clip-on sunglasses uses a resiliently mounted forklike clip that holds to the corrective eyewear frame at the part above the bridge of the user's nose. A disadvantage to conventional clip-on sunglasses is the bulk and the relatively unattractive appearance created which spoil an effort to be stylish. Clip-ons for most other kinds of eyewear such as scuba masks or ski goggles would be highly impractical.

Another technique to attach corrective lenses mounted in a mounting frame or rim, which has a bridge, to sunglasses or the like has been to remove the existing bridge (sometimes referred to below as a nosepiece, etc.) From the sunglasses and to snap in its place the corrective eyewear frame bridge. However, such corrective lenses had to be specially made to fit a given corrective eyewear frame. Usually the optician would have to request from a lens manufacturer or vendor the needed lenses with the correct magnification characteristics, axis orientation for astigmatism, shape to fit the corrective eyewear frame, etc. These procedures require substantial time, equipment, cost, etc., and delay delivery of the finished eyewear to a customer, usually by days and sometimes longer.

Accordingly, there is a need in the eyeglass art for an inexpensive and readily adaptable way of combining corrective eyewear and non-corrective eyewear.

There also is a need to provide such combined corrective and non-corrective eyewear to customers in a very short time, e.g., same day or even for substantially immediate purchase.

There also is a need to effect such combining while providing an aesthetically pleasing and/or stylish appearance.

SUMMARY OF THE INVENTION

One aspect of the invention relates to an eyewear attachment including a corrective eyewear attachment with one or both lenses being rotatable.

Another aspect of the invention relates to an eyewear attachment including a corrective eyewear attachment with geometrically round lens shape.

Another aspect of the invention relates to an eyewear attachment including a corrective eyewear attachment with one or both lenses being rotatable and a nose piece coupler for attaching the corrective eyewear attachment to non-corrective eyewear.

Another aspect of the invention relates to an eyewear attachment including a corrective eyewear attachment with geometrically round lens shape and a nose piece coupler for attaching the corrective eyewear attachment to non-corrective eyewear.

According to another aspect, the invention relates to an eyewear attachment for non-corrective eyewear including a corrective attachment including at least one mounting rim and at least one rotatable lens attached to the at least one mounting rim and rotatable therein, the corrective attachment being connectable to non-corrective eyewear for support with respect thereto.

According to another aspect, the invention relates to an eyewear attachment for non-corrective eyewear including a corrective attachment including at least one mounting rim and at least one geometrically round shape lens attached to the at least one mounting rim and rotatable with respect thereto.

According to another aspect, the invention relates to a method of using a corrective attachment with a rotatable lens with non-corrective eyewear including determining the desired orientation of a corrective lens; rotating the corrective lens in a lens mounting rim, the lens mounting rim being attachable to at least one non-corrective eyewear; and attaching the lens and mounting rim to the at least one non-corrective eyewear.

According to another aspect, the invention relates to a method of using a corrective attachment with geometrically round shape lens with non-corrective eyewear including determining the desired orientation of a corrective lens; rotating the corrective lens in a lens mounting rim, the lens mounting rim being attachable to at least one non-corrective eyewear; and attaching the lens and mounting rim to the at least one non-corrective eyewear.

According to another aspect, the invention relates to a method of providing vision corrective measures to non-corrective eyewear including selectively attaching a corrective eyewear frame and geometrically round shape lens to a nose piece coupler of a non-corrective eyewear. The corrective eyewear frame and lens may be removed from the non-corrective eyewear and then attached to a different non-corrective eyewear.

According to another aspect, the invention relates to an eyewear system including at least one non-corrective lens and at least one corrective lens, and a nose piece coupler for attaching the non-corrective lens and corrective lens of geometrically round shape in overlying relation.

To the accomplishment of the forgoing and related ends, the invention, then, comprises the features herein after fully described and particulary pointed out in the claims. The following description and the annexed drawings set forth in detail certain illustrative embodiments of the invention. These embodiments are indicative, however, of but a few of the various ways in which the principles of the invention may be employed. Other objects, advantages and novel features will become apparent from the following detailed description of the invention when considered in conjunction with the drawings.

DESCRIPTION

The present invention will now be described more fully with reference to the accompanying drawings in which several embodiments of the invention are shown. The present invention, however, may be embodied in many different forms and should not be construed as limited to the embodiments shown.

Figure 1:
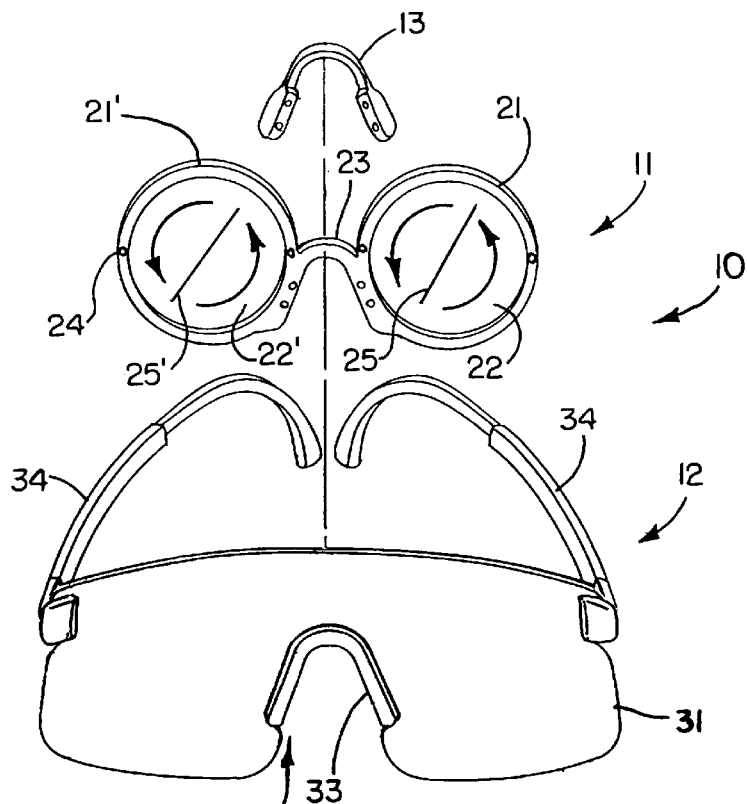
FIG. 1 is an exploded isometric view of a corrective lens eyewear attachment with geometrically round shape lens, non-corrective eyewear and nose piece protector.

Referring, now, in detail to the drawings, wherein like reference numerals designate like parts in the several figures, and initially to FIG. 1, an eyewear system 10 includes a corrective eyewear attachment 11 with geometrically round lens shape (the illustrated example being similar to eyeglasses with the temple pieces), non-corrective eyewear 12 (the illustrated example being sunglasses), and a nose protector 13. In the illustrated embodiment the sunglasses are of a modern stylish design.

Corrective lens eyewear attachment 11 is illustrated in aligned relation for connection to the non-corrective eyewear 12 and the nose protector 13.

The corrective lens eyewear attachment 11 is on the inner side of the non-corrective eyewear 12 such that the corrective lens eyewear attachment 11 will be between the wearer's eyes and the non-corrective eyewear 12. Since the corrective lens eyewear attachment 11 is interior of the non-corrective eyewear 12, the aesthetic qualities of the non-corrective eyewear will be substantially unaffected.

The non-corrective eyewear 12 may be existing sunglasses or other existing devices. As an example, the eyewear 12 may be a stylish pair of sunglasses that does not have any corrective lenses. Using features of the present invention, a corrective eyewear attachment 11may be coupled to such sunglasses, whereby the user or wearer will enjoy the advantages of stylish sunglasses with optical correction.

The corrective eyewear 11 includes a first corrective round lens 21 retained within a first mounting rim 22 and a second corrective lens 21' retained within a second mounting rim 22'. For example, a lens may be snapped into held or retained position in a given mounting rim or frame; various snap connections for retaining lenses in mounting rims are known and may be used. The first mounting rim 22 is connected to the second mounting rim 22' by a nose piece connector or bridge 23, which is referred to below as the "corrective nose piece connector" being associated with the corrective eyewear. The shape and parts of the corrective eyewear may be other that illustrated, provided a suitable lens or lenses are provided and are retained by an appropriate separate or even an integral mounting rim or other structure.

The corrective lenses 21, 21' may be rotatable within mounting rims 22, 22' such that the orientations of the corrective lenses 21, 21' in the mounting rims may be set as they are in the mounting rims or altered subsequent to the initial placement of the lenses in the mounting rims. Two pairs of notches 24 separated by 180° assist in orientating the lenses 21, 21'. The lens orientation is important when the lens or lenses 21, 21' include an orientation axis 25, 25' that must be set to a particular angle to achieve proper vision correction, e.g., for correction of astigmatism.

The ability to rotate the lenses 21, 21' subsequent to the fabrication and placement in the mounting rims 22, 22' is useful when the corrective lens prescription corrects for astigmatism or any other orientation dependent problem. The lenses 21, 21' are circular and fit snugly inside circular mounting rims 22, 22'. However, lenses 21, 21' and mounting rims 22, 22' may be of any shape which allow rotation, one example being polygonal allowing discrete steps of rotation. Thus, only a single rotatable prefabricated lens of a particular optical prescription need be kept in stock whereas the prior art required either multiple non-rotatable prefabricated lenses (one for each different desired orientation) be stocked or that additional lens fabrication steps must be performed.

The non-corrective eyewear 12 includes a single lens 31, a nose piece connector 33 (referred to as the "non-corrective nose piece connector" being associated the non-corrective eyewear 12) and a pair of temple pieces or arms 34. The pair of arms 34 connected to the far sides of lens 31 are used to secure the eyewear 12 in front of the eyes of the wearer. Although the stylish design of non-corrective eyewear 12 uses temple pieces directly connected to the lens 31, it is also possible in another style to include a partial or full mounting rim for supporting the lens and to which the temple pieces may be attached, if desired. The non-corrective nose piece connector 33 may be separately formed from lens 31 or may be formed integrally with lens 31. The non-corrective nose piece connector 33 may be formed of material that forms the lens 31 or from another material. The non-corrective lens 31 may be two lenses retained by a retaining rim rather than a single piece. In other words, the non-corrective eyewear can take on almost any form while practicing the principles of the present invention. For example, non-corrective eyewear 12 could be sunglasses, skiing goggles, scuba masks, police riot helmets, gas masks, a virtual reality helmet or a heads up display.

The non-corrective nose piece connector 33 may be part of the non-corrective eyewear 12 as manufactured. Alternatively, for non-corrective eyewear 12 which has some sort of nose piece, e.g., to distribute force or pressure over the nose of a wearer, that nose piece could be removed and the connector 33 substituted in place thereof. As another alternative, the connector 33 may be of a configuration to attach to an existing nose piece or other part of non-corrective eyewear 12.

Both the non-corrective and corrective lenses may be of almost any shape, size, color, material, or the like, and the frames may be metal, plastic, composite, or any other suitable material. For example, both the lenses and the frames may be a plastic such as polycarbonate.

Figure 2:
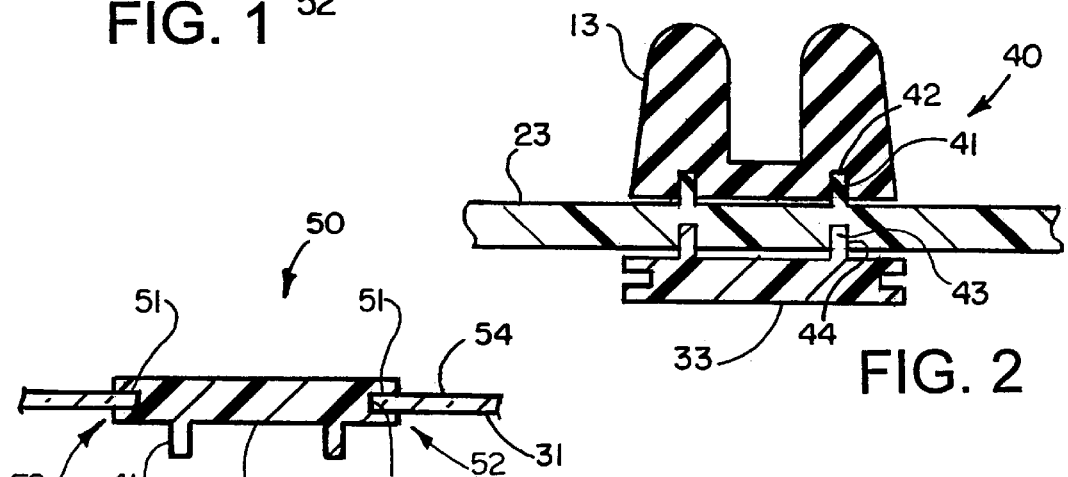
FIG. 2 is a fragmentary top view, in section, showing the assembled nose piece connector and the nose piece protector of the assembled corrective eyewear attachment and non-corrective eyewear of FIG. 1.

FIG. 2 is a top view of a securement mechanism or retainer 40 to retain the corrective and non-corrective eyewear 11, 12 together. The securement mechanism 40 includes the nose protector 13, the corrective nose piece connector 23 and the non-corrective nose piece connector 33. The corrective nose piece connector 23 is between the non-corrective nose piece connector 33 and the nose protector 13. Posts 41 on the corrective nose piece connector 23 fit into openings 42 in the nose protector 13 to retain the nose protector thereon, and posts 43 on the non-corrective nose piece connector 33 fit in opening 44 in the corrective nose piece connector 23 to hold the corrective and non-corrective eyewear 11, 12 together. Alternatively, posts 41, 42 both may be on the corrective nose piece connector 23; non-corrective nose piece connector 33 could be formed integrally with the non-corrective eyewear 12; and/or the corrective nose piece connector 23 could be formed integrally with the non-corrective nose piece connector 33. A more mechanically stable structure results where two or more elements are formed integrally. However, integrally forming two or more elements reduce the number of combinations possible thereby lessening the variety of eyewear combinations from a given number of parts. For example, 30 different pieces for three elements (10 choices for each of three elements) allows for a thousand combinations or varieties of eyewear to be produced. However, if two of the elements are integrally formed, the 30 different pieces result in only 225 possible combinations or varieties of eyewear. To have a thousand combinations or varieties of eyewear requires at least 64 different pieces.

Nose piece protector 13 may be a relatively soft, pliable material that fits comfortably against the nose or bridge of the nose of a person wearing the combined eyewear 11, 12 or just the non-corrective eyewear 12. Preferably the nose piece protector 13 helps to spread forces or pressures of the eyewear system 10 over a relatively large area of the nose to maximize the wearer's comfort. Since the protector 13 is behind the lenses, i.e., closer to the wearer's face, it will not detach from aesthetics of the eyeglass system 10, especially from the aesthetics of the no-corrective eyewear.

The nose piece connector 23 may be relatively rigid to match the shape of the corrective eyewear to hold the lenses in proper orientation relative to each other. The nose piece connector 33 may be relatively rigid or may be relatively flexible, according to the nature of the lens or lenses (FIG. 5) 31, 31', the rims 32, 32' and/or other frame/support structure, provided the corrective eyewear 11 and non-corrective eyewear 12 will remain properly aligned and positioned for use by a person.

The posts 41, 43 may be any shape or shapes which will mechanically retain two components together. For example, a circular post, square post or rectangular post could be used. The post may include an extended portion perpendicular to the post so as to click or resiliently deform over a detent as it is urged into place thereby locking two components together in a more secure fashion. A bonding or adhesive material may be used instead of or in addition to the above for a permanent joining of two components. Any configuration or method of joining two components may be employed provided the retention of the nose piece connectors 23, 33 and eyewear 11, 12 is achieved.

As another example, the openings 44 in the corrective nose piece connector 23 may extend fully therethrough so posts 43 can extend fully therethrough and couple to the nose protector 13 in openings 42 thereof. This arrangement may eliminate a need for posts 41.

Figure 3:
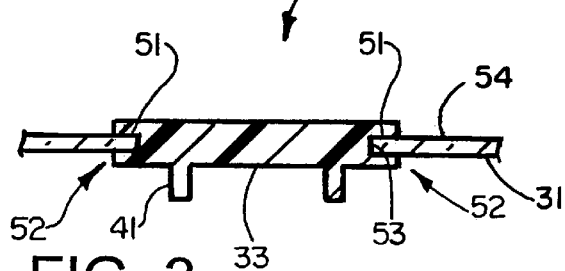
FIG. 3 is a fragmentary cross-section view of a non-corrective nose piece connector and the adjacent portion of the non-corrective eyewear.

FIG. 3 is a cross-sectional top view of a retainer or mounting arrangement 50 of a non-corrective nose piece connector 33 engages the non-corrective eyewear lens 31 at an edge 51 of the nose or bridge opening 52 of the lens. The connective edge 51 fits into a grove 53 in non-corrective nose piece connector 33. The sidewalks of the groove 53 prevent the non-corrective nose piece connector 33 from moving in a direction perpendicular to the surface 54 of the non-corrective eyewear 12. In the illustrated embodiment the sizes and shapes of the nose piece 33, lens 31, edge 51, bridge opening area 52 and groove 53 are such that the lense and nose piece are relatively securely retained together.

Figure 4:
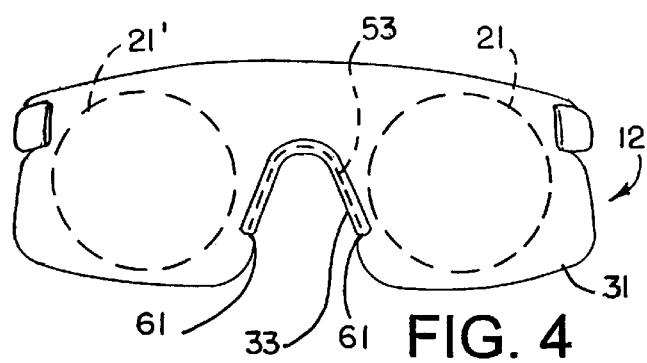
FIG. 4 is a front view of an attached arrangement of a pair of sunglasses and the corrective lens eyewear attachment.

FIG. 4 is a front view of the corrective lens eyewear attachment connected to non-corrective eyewear 12 (e.g., sunglasses). As can be seen from FIG. 4, detents 61 in the lens 31 retain the non-corrective nose piece connector 33 in attached relation to the lens 31 with the edge 51 of the lens 12 in the groove 53. The detent 51 may be part of a conventional sunglass lens 31, for example, used to retain a conventional nose piece (not shown) to the lens. If the lens 31 is sufficiently flexible, such nose pieces can be removed and the con-corrective nose piece connector 33 can be installed as described above.

In using the invention, a customer can come to a vendor of corrective eyewear with a prescription for corrective lenses. In the example here, such prescription may have a given axis orientation for addressing astigmatism. The vendor has a standard mounting rim 22, 22' and selects for insertion therein the prescription lenses. The prescription lenses may have the desired magnification characteristics and prism, for example, to address the astigmatism. The astigmatism correction feature has an axis characteristic/parameter. The rim has a circular configuration, and the lenses have a corresponding configuration. The lenses can be mounted in the mounting rim in an orientation placing the mentioned axis at the desired angular (polar) orientation for properly addressing the astigmatism of the patient. There is no need to order special lenses or mounting rims from a remote location. The corrective eyewear can be prepared substantially immediately for the patient's need.

Figure 5:
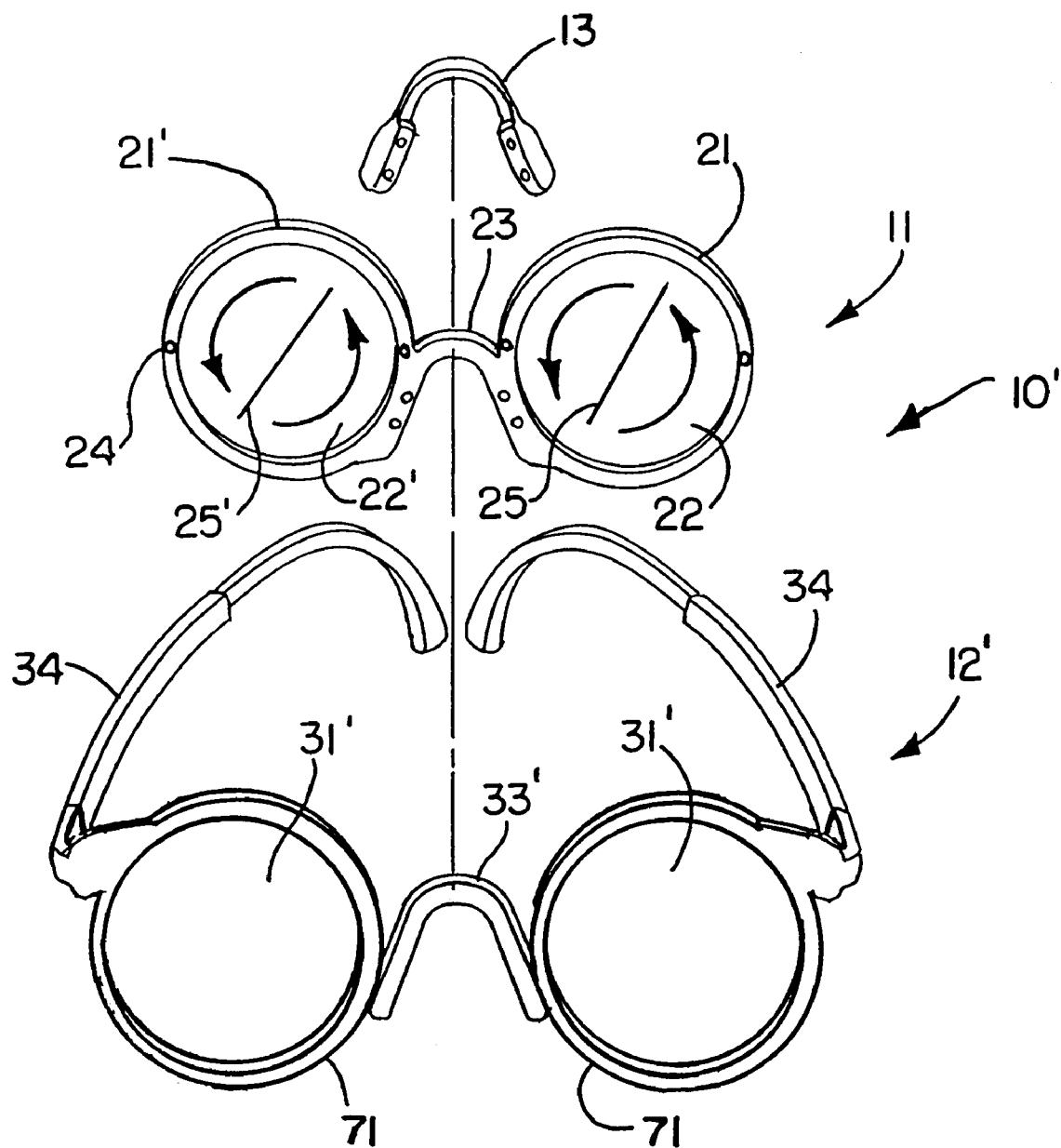
FIG. 5 is an exploded isometric view of a corrective lens eyewear attachment, another embodiment of non-corrective eyewear and nose piece protector.

FIG. 5 illustrates another embodiment of eyewear system 10' including a corrective lens eyewear attachment 11 in aligned relation for connection to non-corrective eyewear 12', which has two lenses 31' held in a mounting rim 71 and a nose protector 13. The corrective lens eyewear attachment 11 is on the inner side of the non-corrective eyewear 12' such that the corrective lens eyewear attachment 11 will be between the wearer's eyes and the non-corrective eyewear 12'. Since the corrective lens eyewear attachment 11 is interior of the non-corrective eyewear 12', the aesthetic qualities of the non-corrective eyewear will be substantially unaffected.

The non-corrective eyewear 12' includes lens 31' retained within respective mounting rims 71. The rims 71 are connected by non-corrective nose piece connector 33'. A pair of arms or temple pieces 34 connected to the far sides of mounting rims 71 are used to secure the non-corrective eyewear 12' in front of the eyes of the wearer. It is possible to eliminate part or all of the mounting rims 71, for example, by attaching the connector 33 and arms 34 directly to the lenses 31'. The non-corrective nose piece connector 33' may be formed separate from mounting rims 71 or may be formed integral with mounting rims 71. The non-corrective nose piece connector 33' may be formed of material that forms the lenses 31' or from another material. In other words, the non-corrective eyewear can take on almost any form provided the principles of the present invention may be practiced. For example, eyewear 12' could be sunglasses, skiing goggles, scuba masks, police riot helmets, gas masks, a virtual reality helmet or a heads up display.

The corrective and non-corrective eyewear 11, 12' may be coupled together as the eyewear system 10 in the manner described above for the eyewear system 10.

The present invention may be incorporated into newly fabricated eyewear or may be retrofitted into existing non-corrective eyewear 12, 12'. In some instances, the shape or configuration of the non-corrective eyewear 12, 12' will allow for the attachment of the corrective eyewear 11 without modification of the non-corrective eyewear. The selection of a non-corrective nose piece connector 33, 33' that fits is all that is required. However, in other instances, the non-corrective eyewear 12, 12' will need to be modified to attach the corrective and non-corrective eyewear 12, 12'.

The modification may include drilling or otherwise forming post holes in the non-corrective eyewear, a recess could be formed in the non-corrective eyewear so as to provide a snug fit for the non-corrective nose piece connector 33, 33', or posts could be attached to the non-corrective eyewear, a groove could be formed along the nose piece area 61 such that the connector can be placed into that groove or any other appropriate modification.

The rotatable corrective lenses make 31, 31' it is possible conveniently to supply many corrective prescriptions using a relatively small number of lenses since the corrective lenses may be placed in a lens attachment frame and then rotated to a particular orientation to obtain a desired axis orientation. This eliminates the need to stock multiple prefabricated lenses that have different axis orientations for each prescription.

Another advantage of rotatable lenses is that when a patient's prescription as to axis changes, the lenses need only be rotated to the correct axis position. In contrast a lens that cannot be rotated would be discarded at a substantial financial loss and a new lens be fabricated or cut into the appropriate shape at the appropriate angle.

The present invention may be used for recreational eyewear or equipment. For example, an occasional skier or scuba diver who might otherwise forgo corrective lenses while on the ski slopes or in the water because of the substantial time and expense of having corrective ski goggles or a corrective diving mask custom made. Using the principles and features of the invention correction easily can be provided for such equipment. Since more people could afford corrective goggles or masks, the safety and enjoyment of skiing and diving would improve. Likewise, improvements in visions, safety, enjoyment and the like would accrue for other types of eyewear. For the multiple eyewear user this can be very economical, especially when a prescription changes. Examples of eyewear useful with the present invention include, but are not limited to, sunglasses, skiing goggles, scuba masks, gas masks, welding masks, heads up displays and virtual reality headgear.

Another advantage of the rotatable lenses of the present invention is that the lens cutting equipment typically required to be at the point of sale becomes unnecessary. Accordingly, a retailer or renter of eyewear of the present invention need not provide the space for the lens cutting equipment nor does the retailer have to pay for the rental or purchase of eyeglass cutting equipment.

What has been described above are several embodiments of the present invention. It is of course not possible to describe every conceivable combination or permutation of components or methodologies for purposes of describing the present invention, but one of ordinary skill in the art will recognize that many further combinations and permutations of the present invention are possible. Accordingly the present invention is intended to embrace all such alternatives, modifications, and variations that fall within the scope of the appended claims. Although several embodiments and features are described above and are illustrated in the respective drawing figures, it will be appreciated that the features described and illustrated with respect to a given embodiment may be used or incorporated in one or more of the other embodiments.

What is claimed is:

1. An eyewear attachment for non-corrective eyewear comprising:
    a corrective attachment including:
        at least one mounting rim; and
        at least one rotatable lens attached to the at least on mounting rim and rotatable therein,
    further comprising in combination therewith non-corrective eyewear for supporting the corrective attachment, and
    wherein the at least one lens has an axis or axes that can be orientated to correct for an astigmatism.

2. The attachment according to claim 1, wherein the at least one lens is a prefabricated lens.

3. The attachment according to claim 1, wherein the lenses are circular.

4. The attachment according to claim 1, wherein the non-corrective eyewear includes sunglasses.

5. The attachment according to claim 1, wherein the non-corrective eyewear include two arms to secure the non-corrective eyewear to a wearer.

6. The attachment according to claim 5, wherein the non-corrective eyewear is sunglasses.

7. The attachment of claim 1, wherein the corrective attachment will be between a head of an eyewear wearer and the non-corrective eyewear when the corrective attachment is attached to the non-corrective eyewear.

8. The attachment according to claim 1, wherein the corrective attachment includes at least one plastic material.

9. An eyewear attachment for non-corrective eyewear comprising:
    a corrective attachment including:
        at least one mounting rim; and
        at least one rotatable lens attached to the at least on mounting rim and rotatable therein,
    further comprising a nose piece coupler,
    wherein the nose piece coupler is removably attached to the non-corrective eyewear.

10. The attachment according to claim 9, wherein the nose piece coupler includes at least one of posts and post holes.

11. An eyewear attachment for non-corrective eyewear comprising:
    a corrective attachment including:
        at least one mounting rim; and at least one rotatable lens attached to the at least on mounting rim and rotatable therein, further comprising a nose piece coupler for attaching the corrective attachment to non-corrective eyewear.

12. The attachment according to claim 11, further comprising a nose protector.

13. The attachment according to claim 11, wherein the nose piece coupler includes at least one of posts and post holes.

14. The attachment according to claim 11, wherein the nose piece coupler is removably attached to the non-corrective eyewear.

15. A method of using a corrective attachment with non-corrective eyewear comprising:

determining the desired orientation of a corrective lens;

rotating the corrective lens in a lens mounting rim, the lens mounting rim being attachable to at least one non-corrective eyewear; and attaching the lens and mounting rim to the at least one non-corrective eyewear.

16. The method of claim 15, wherein the desired orientation of the lens is selected to compensator for an astigmatism.

17. The method of claim 15, further comprising mounting the lens in the lens mounting rim.

18. The method of claim 15, wherein the corrective lens is a prefabricated corrective lens.

19. The method of claim 15, further comprising:

determining the desired orientation of another corrective lens; and rotating the another corrective lens in another lens mounting rim, the another lens mounting rim.

20. A method of providing vision corrective measures to non-corrective eyewear, comprising:

selectively attaching a corrective eyewear frame and rotatable lens to a nose piece coupler of a non-corrective eyewear.

21. The method of claim 20, wherein the non-corrective eyewear is sunglasses and said selectively attaching comprises using a post connector to retain the corrective eyewear frame and the non-corrective eyewear as a substantially integral structure.

22. The method of claim 20, wherein the lens has an axis, and further comprising rotating the lens in the frame to obtain a desired alignment of the lens axis.

23. The method of claim 20, further comprising removing the corrective eyewear frame and lens from the non-corrective eyewear and attaching the corrective eyewear frame and lens to different non-corrective eyewear.

24. An eyewear system comprising at least one non-corrective lens and at least one rotatable corrective lens, and a nose piece coupler for attaching the non-corrective lens and corrective lens in overlying relation.

25. The eyewear system according to claim 24, wherein the at least one corrective lens will be between a head of the eyewear system wearer and the at least one non-corrective lens when the at least one corrective lens is attached to the at least one non-corrective lens.

26. The eyewear system according to claim 24, further comprising a nose protector.

27. The eyewear system according to claim 24, wherein the nose piece coupler includes at least one of posts and post holes.

28. The eyewear system according to claim 24, wherein the nose piece coupler is removably coupled to the at least one non-corrective lens.

29. The eyewear system according to claim 24, wherein the at least one non-corrective lens includes sunglasses.

30. The eyewear system according to claim 24, wherein the at least one corrective lens is circular.

31. The eyewear system according to claim 24, wherein the at least one corrective lens has an axis or axes that can be orientated to correct for an astigmatism.

32. The eyewear system according to claim 24, further comprising two arms to secure the at least one non-corrective lens to a wearer.

33. The eyewear system according to claim 24, wherein the at least one corrective lens includes at least one plastic material.

34. The eyewear system according to claim 24, wherein:

the at least one rotatable corrective lens is rotatably mounted in a mounting rim; and the mounting rim connectable with respect to non-corrective eyewear for support with respect thereto.

35. An eyewear system, comprising:

at least one non-corrective lens;

at least one rotatable corrective lens; and a nose piece coupler for attaching the at least one non-corrective lens and the rotatable corrective lens in overlying relation.

* * * * *